United States Patent
Furukawa et al.

(10) Patent No.: US 8,553,512 B2
(45) Date of Patent: Oct. 8, 2013

(54) MAGNETIC HEAD SLIDER INSPECTION DEVICE

(75) Inventors: Masaru Furukawa, Fujisawa (JP); Yukio Kato, Sagamihara (JP); Junguo Xu, Kasumigaura (JP)

(73) Assignee: Hitachi, Ltd., Tokyo (JP)

( * ) Notice: Subject to any disclaimer, the term of this patent is extended or adjusted under 35 U.S.C. 154(b) by 249 days.

(21) Appl. No.: 13/078,580

(22) Filed: Apr. 1, 2011

(65) Prior Publication Data

US 2011/0242954 A1 Oct. 6, 2011

(30) Foreign Application Priority Data

Apr. 6, 2010 (JP) ................................. 2010-087783

(51) Int. Cl.
*G11B 27/36* (2006.01)
(52) U.S. Cl.
USPC ..................................................... 369/53.38
(58) Field of Classification Search
USPC ............ 369/53.38, 53.25, 53.26, 53.39, 53.4, 369/47.36, 47.44, 112.27; 360/75, 121, 62, 360/73.03, 99.08, 99.12, 31, 113, 60, 53; 29/603.09, 603.11
See application file for complete search history.

(56) References Cited

U.S. PATENT DOCUMENTS 5,982,568 A * 11/1999 Yamamoto et al. ............. 360/31
6,965,492 B2 * 11/2005 Obata et al. ................ 360/99.08
7,012,775 B2 * 3/2006 Suzuki et al. .................... 360/75
8,169,754 B2 * 5/2012 Druist et al. ............... 360/324.2
8,225,486 B2 * 7/2012 Takahashi et al. ......... 29/603.09
8,323,518 B2 * 12/2012 Hirata et al. .................... 216/24

FOREIGN PATENT DOCUMENTS

| JP | 63-187422 | 8/1988 |
| JP | 05-307718 | 11/1993 |
| JP | 09-190611 | 7/1997 |
| JP | 10-124828 | 5/1998 |
| JP | 2002-245742 A | 8/2002 |
| JP | 2002-342906 A | 11/2002 |
| JP | 2006-190374 A | 7/2006 |
| JP | 3138704 | 12/2007 |

OTHER PUBLICATIONS

Integral Solutions Int'l; Providing Innovative Solutions for the Magnetic Recording Industry; Apr. 21, 2009; http://www.us-isi.com/QST-2002.htm on Feb. 3, 2010.

* cited by examiner

*Primary Examiner* — Ali Neyzari
(74) *Attorney, Agent, or Firm* — Foley & Lardner LLP

(57) ABSTRACT

A magnetic head slider inspection device including a motor unit for revolving a disk medium, a slider unit provided with a reproducing head, which is levitated from a surface of the disk medium under force generated by the revolving disk medium, a magnetic field generator positioned at an opposite side of the disk medium with respect to the slider unit for generating a magnetic field substantially perpendicular to the disk medium surface, and a circuit unit for generating the magnetic field from the magnetic field generator, and measuring a resistance value of the reproducing head levitated from the disk medium surface.

13 Claims, 9 Drawing Sheets

MAGNETIC HEAD SLIDER INSPECTION DEVICE

CLAIM OF PRIORITY

The present application claims priority from Japanese application serial no. JP2010-087783, filed on Apr. 6, 2010, the content of which is hereby incorporated by reference into this application.

BACKGROUND

The present invention relates to a magnetic head slider and a magnetic head slider inspection device. More particularly, the present invention relates to a magnetic head slider which is held above a revolving disk medium, and has a built-in element for changing the resistance value in accordance with external magnetic fields.

Generally, the magnetic disk device includes a magnetic head slider which is levitated in proximity above the revolving magnetic disk. The magnetic head slider has a built-in reproducing head for reading magnetic information recorded in the magnetic disk medium.

The reproducing head is formed of a magnetic body, and configured to change the resistance value in accordance with direction and magnitude of incident magnetic field externally input to the reproducing head. Meanwhile, the magnetic disk medium emits the magnetic field from the magnetic layer therein toward its surface. The direction of the magnetic field corresponds to the information recorded in the magnetic disk medium. Magnitude of the magnetic field corresponds to density of the information recorded in the magnetic disk medium. The reproducing head is brought into the magnetic field emitted from the magnetic disk medium so that the resistance value of the reproducing head changes in accordance with the information recorded in the magnetic disk medium. The magnetic disk device is structured to read the recorded information by measuring variation of the resistance value of the reproducing head using an electric circuit.

For developing the reproducing head, the head is required to be designed to increase variation of the measured resistance value of the reproducing head to the external magnetic field. Hereinafter, the variation of the resistance value of the reproducing head to the external magnetic field will be referred to as "performance of the reproducing head".

There is often the case that when the magnetic disk device is externally damaged, the magnetic head slider is brought into contact with the magnetic disk medium to damage the reproducing head, thus changing performance of the reproducing head. Hereinafter, performance change in the reproducing head caused by the damage will be referred to as "damage amount of the reproducing head". For this, it is important to design the reproducing head with a small amount of damage, that is, high durability against the damage of the reproducing head measured when the magnetic head slider is brought into contact with the magnetic disk medium.

In the method for measuring performance and damage amount of the reproducing head, the magnetic head slider is levitated by the magnetic disk device so as to capture the magnetic field from the magnetic disk medium with the reproducing head for measuring the variation of the resistance value of the reproducing head. In another method, the magnetic head slider as the single body is used to measure variation in the resistance value of the reproducing head to the external magnetic field while externally applying the magnetic field to the magnetic head slider. As an example, the method according to Japanese Unexamined Patent Publication No. 5-307718 or the method using the device introduced in the Non-patent Document of QST-2002.pdf (web page: http://www.us-isi.com/QST-2002.htm) may be employed.

With the aforementioned method using the magnetic disk device, magnitude of the magnetic field applied to the reproducing head varies in accordance with the structure of the magnetic disk medium, levitation distance of the magnetic head slider, and the recording density of the magnetic disk medium. It is therefore difficult to quantitatively measure performance of the reproducing head.

With the aforementioned method using the magnetic head slider as a single unit, the state of the levitated magnetic head slider during the measurement cannot be reproduced. Generally, the magnetic head slider within the magnetic disk device is levitated above the magnetic disk medium which revolves at 4000 rpm to 15000 rpm while keeping the gap of several nano meters. While it is levitated, the temperature of the reproducing head changes owing to heat transfer. It is therefore difficult to derive performance of the levitated reproducing head from the performance of the reproducing head which is not levitated. Furthermore, it is also difficult to obtain the damage amount of the reproducing head when the magnetic head slider is brought into contact with the magnetic disk medium.

SUMMARY

It is an object of the present invention to provide a magnetic head slider inspection device capable of providing performance of the reproducing head of the levitated magnetic head slider, and a damage amount of the reproducing head resulting from contact of the magnetic head slider with the magnetic disk medium.

The present invention provides a magnetic head slider inspection device including a motor unit for revolving a disk medium, a slider unit provided with a reproducing head, which is levitated from a surface of the disk medium under force generated by the revolving disk medium, a magnetic field generator positioned at an opposite side of the disk medium with respect to the slider unit for generating a magnetic field substantially perpendicular to the disk medium surface, and a circuit unit for generating the magnetic field from the magnetic field generator, and measuring a resistance value of the reproducing head levitated from the disk medium surface.

According to the present invention, performance of the reproducing head of the levitated magnetic head slider as well as its damage amount resulting from contact of the magnetic head slider with the magnetic disk medium may be provided.

DESCRIPTION OF THE PREFERRED EMBODIMENTS

Figure 1A:
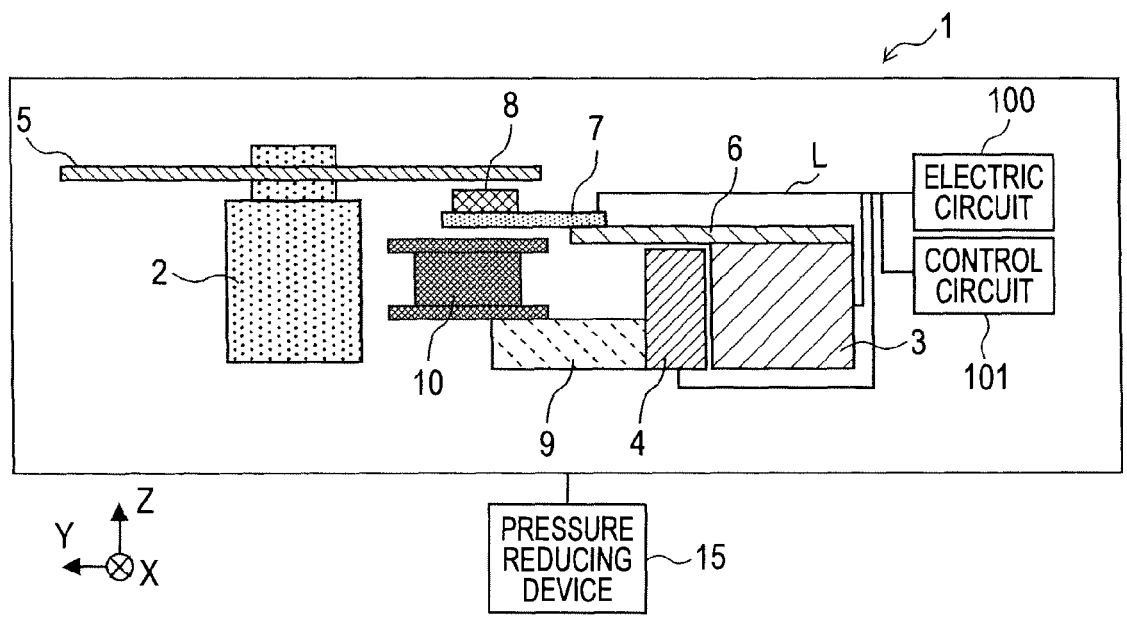
FIG. 1A is a Y-Z plan view of a magnetic head slider inspection device according to an embodiment of the present invention.

An embodiment of a magnetic head slider inspection device according to the present invention will be described referring to the drawings. Measurement of performance and damage amount of the reproducing head will be hereinafter referred to as "performance measurement".

FIG. 1A schematically shows an embodiment of the magnetic head slider inspection device. For convenience of explanation, each size of the elements is relatively changed, and coordinate axes of X-axis, Y-axis, and Z-axis are defined as shown in the drawings.

A magnetic head slider inspection device 1 includes a sealed casing (not shown). A spindle 2, a head assembly support mechanism 3, and an electromagnet support mechanism 4 are provided on a bottom of the casing. A disk medium 5 is attached to a top portion of the spindle 2 so as to be revolved as rotation of the spindle 2. According to the description, a magnetic body is applied to the disk medium 5 as the magnetic disk medium. However, it may be the one formed of aluminum, silicon, glass, sapphire and the like without being coated with the magnetic body besides the magnetic disk medium. That the disk medium 5 is used for reproducing the environment in which a magnetic head slider 8 is actually used, and accordingly, an arbitrary material may be used for forming the disk medium so long as it is revolved by the spindle 2 to generate the force for levitating the magnetic head slider 8.

The head assembly support mechanism 3 is formed of triaxial stage (not shown) movable in X-axis, Y-axis and Z-axis directions, and is provided with a head assembly grip mechanism 6 at its top portion. A head assembly 7 is gripped by the head assembly grip mechanism 6.

Figure 3:
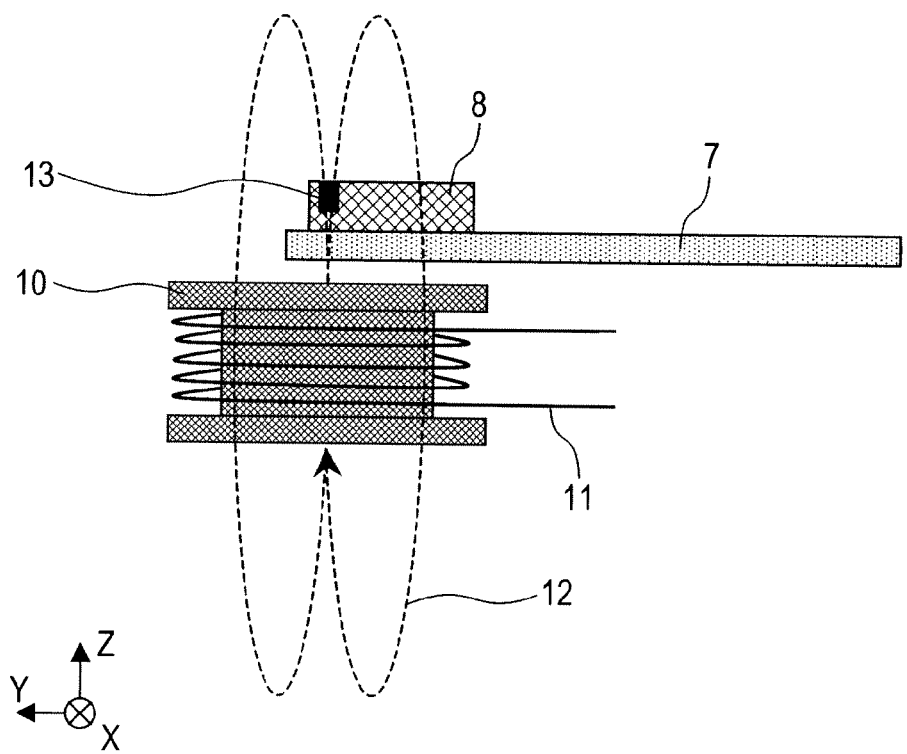
FIG. 3 is an explanatory view representing a relation between a magnetic field from an electromagnet of the magnetic head slider inspection device and a reproducing head.

The head assembly 7 has the magnetic head slider 8 with a built-in reproducing head 13 at its leading end (shown in FIG. 3). The stage of X-axis and Y-axis of the head assembly support mechanism 3 is activated while revolving the disk medium 5 so that the magnetic head slider 8 moves to a position corresponding to an arbitrary position on the disk medium 5, and outside thereof.

The distance between the head assembly 7 and the disk medium 5 varies for each design condition of the head assembly 7. The magnetic head inspection device according to the present invention is configured to move the Z-axis stage of the head assembly support mechanism 3 to adjust the distance between the head assembly 7 and the disk medium 5.

The electromagnet support mechanism 4 is formed of triaxial stage (not shown) of X-axis, Y-axis and Z-axis, and provided with an electromagnet 10 via a member 9. The electromagnet 10 is movable to a position corresponding to an arbitrary position on the disk medium 5 including the lower portion of the magnetic head slider 8, and outside the disk medium 5 by driving the stage of X-axis and Y-axis of the electromagnet support mechanism 4.

A pressure reducing device 15 (for example, pump for reducing/intensifying pressure) is provided outside the casing of the magnetic head slider inspection device 1 for pumping air out of the casing to reduce the pressure. Since the casing is sealed, it is possible to fill such gas as helium, or water vapor to adjust humidity as well as pressure reduction. The use of the pressure reducing device 15 allows performance measurement of the reproducing head 13 in accordance with various environments (for example, cabin of the aircraft during flight at the pressure lower than that on the ground).

The magnetic head slider inspection device 1 is provided with a substrate which includes an electric circuit 100 and a control circuit 101 that are connected with lead wire L. The electric circuit 100 applies electric current to the element built in the magnetic head slider 8, the spindle 2, the head assembly support mechanism 3, the electromagnet support mechanism 4, a conductive wire 11 (described later referring to FIG. 3), and the pressure reducing device 15. The control circuit 101 measures the resistance value of the reproducing head 13 built in the magnetic head slider 8 and the resistance value of the element, and controls the current applied to the spindle 2, the head assembly support mechanism 3, the electromagnet support mechanism 4, and the conductive wire 11, and the pressure reducing device 15, respectively. As the element built in the magnetic head slider 8, a recording head (not shown) for generating the magnetic field from the magnetic head slider 8 to the disk medium 5, a heater element (not shown) formed of a resistor element for expanding the structure of the magnetic head slider 8 by causing thermal expansion of the element, an element (not shown) for measuring the temperature, and the like may be employed besides the reproducing head 13. The performance of the reproducing head 13 may be measured while applying electric current to those elements.

In the following description, the electric circuit 100 and the control circuit 101 are provided inside the magnetic head slider inspection device 1. However, they may be provided outside the casing of the magnetic head slider inspection device 1. The control circuit 101 may be replaced by the information processing device such as personal computer (PC) (not shown) for executing equivalent processes to those performed by the circuits.

Figure 1B:
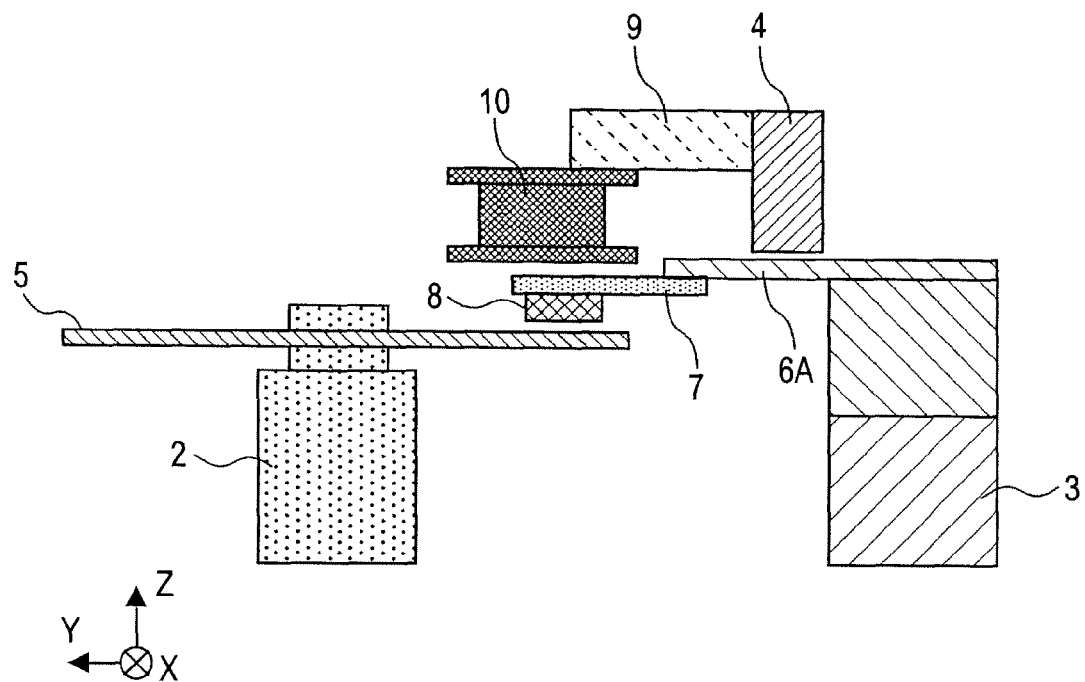
FIG. 1B is a Y-Z plan view of a magnetic head slider inspection device according to an embodiment of the present invention (head assembly support mechanism and an electromagnet support mechanism are placed at the upper side of the disk medium)

In the following description, the head assembly support mechanism 3 and the electromagnet support mechanism 4 are provided below the disk medium 5. Referring to FIG. 1B, they may be provided above the disk medium 5, and include a head assembly grip mechanism 6A for supporting those mechanisms. The substrate having the electric circuit 100 and the control circuit 101 connected with the lead wire L, and the pressure reducing device 15 are provided as shown in FIG. 1A, which are not particularly shown in the drawings subsequent to FIG. 1A.

The electromagnet support mechanism 4 is formed of the triaxial stage (not shown) of X-axis, Y-axis and Z-axis, and provided with the electromagnet 10 via the member 9. The electromagnet 10 is movable to a position corresponding to an arbitrary position on the disk medium 5 including the upper portion of the magnetic head slider 8, and outside the disk medium 5 by activating the stage of X-axis and Y-axis of the electromagnet support mechanism 4.

Figure 2:
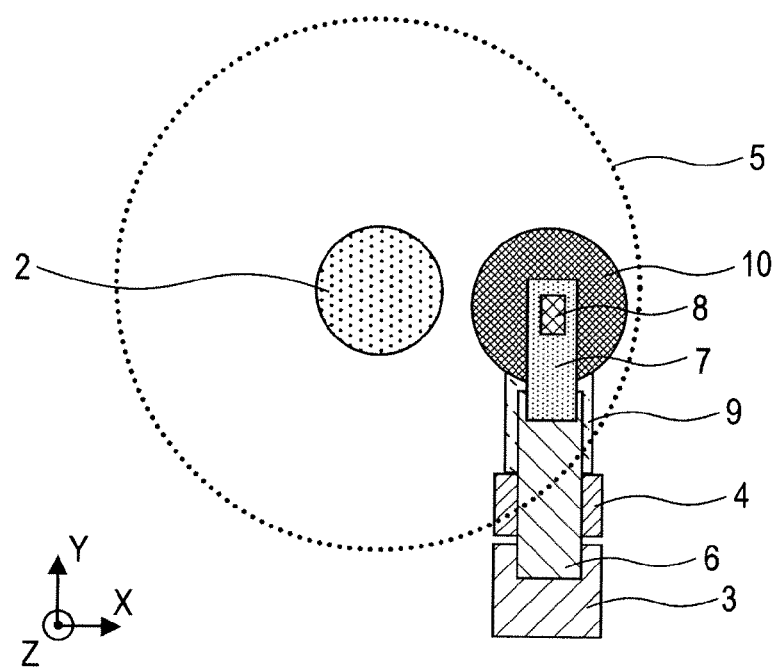
FIG. 2 is an X-Y plan view of the magnetic head slider inspection device.

FIG. 2 is an X-Y plan view of the magnetic head slider inspection device 1 shown in FIG. 1A when seen from the Z direction. The disk medium 5 is shown in a transmissive manner.

FIG. 3 is an explanatory view representing a relation between the electromagnet 10 and the magnetic head slider 8 of the magnetic head slider inspection device 1 in detail. The conductive wire 11 is wound around the electromagnet 10. Upon application of electric current to the wire 11, magnetic field is generated around the electromagnet 10. Assuming that the electric current is applied to the wire 11 in the direction so that the N-pole is formed on the upper surface of the electromagnet 10, the magnetic line 12 is generated from the upper surface of the electromagnet 10, and passes through the reproducing head 13 to return to the lower surface of the electromagnet 10. The magnetic field generated by the electromagnet 10 has the magnitude proportional to that of the electric current applied to the wire 11. Meanwhile, upon application of electric current in an opposite direction to the wire 11, the N-pole is formed on the lower surface of the electromagnet 10. Then the magnetic line 12 from the lower surface of the electromagnet 10 passes through the reproducing head 13, and returns to the upper surface of the electromagnet 10. The control circuit 101 controls magnitude and direction of the electric current applied to the electromagnet 10 to ensure control of the magnitude and direction of the magnetic field applied to the reproducing head 13 in an arbitrary manner.

The magnitude of the magnetic field varies in accordance with the distance between the electromagnet 10 and the reproducing head 13. Referring to FIG. 1A, the magnitude of the magnetic field may be varied by moving the Z-axis stage of the electromagnet support mechanism 4. The magnetic head slider inspection device 1 according to the embodiment is configured to apply the magnetic field with arbitrary magnitude to the magnetic head slider 8 which is in the levitated or non-levitated state. The resistance value of the reproducing head 13 at that timing is measured to realize performance measurement of the reproducing head 13.

The optimum value of the magnitude of the magnetic field applied to the reproducing head 13 is determined by the recording density of the magnetic disk medium set in the magnetic disk device with which the magnetic head slider 8 is combined. Generally, as the recording density becomes higher, intensity of the magnetic field which reaches the magnetic head slider 8 from the magnetic disk medium is decreased. When conducting the performance measurement of the reproducing head 13 of the magnetic head slider 8 used in the existing magnetic disk device, application of magnetic field at the magnitude of ±500 Oe (oersted) will be sufficient.

FIGS. 4A to 4D show examples of performance measurement of the reproducing head 13 of the magnetic head slider inspection device 1, respectively. Each X-axis of the graphs shown in FIGS. 4A to 4D refers to the magnitude of the external magnetic field applied to the reproducing head 13, and each Y-axis of the graphs refers to the resistance value of the reproducing head 13. Each of those examples shows the result derived from increasing the magnitude of the magnetic field from −500 Oe to +500 Oe, and then decreasing the magnitude from +500 Oe to −500 Oe.

Figure 4A:
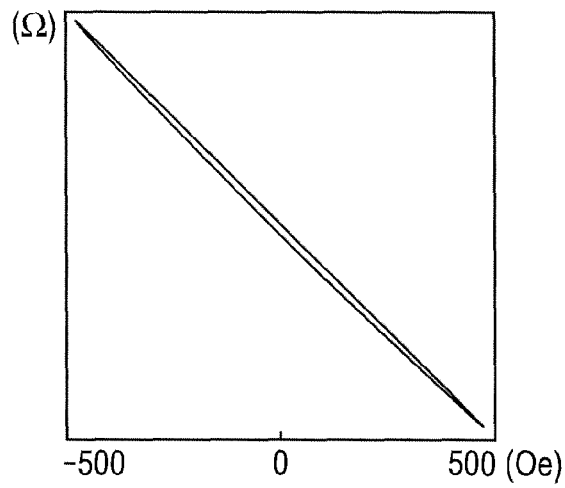
FIG. 4A is an explanatory view showing a measurement example of the magnetic head slider inspection device (in normal state)
Figure 4B:
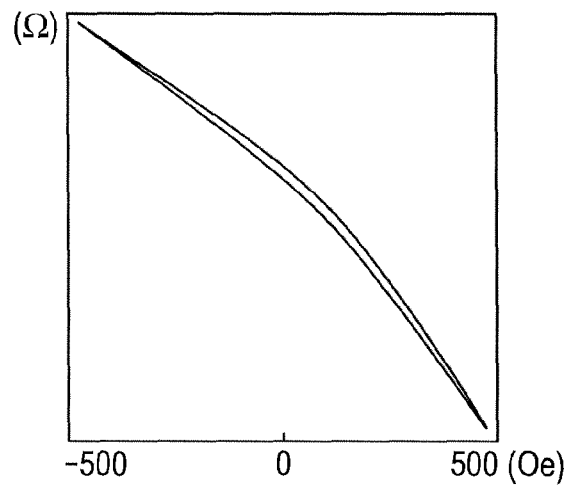
FIG. 4B is an explanatory view showing a measurement example of the magnetic head slider inspection device (in abnormal state)
Figure 4C:
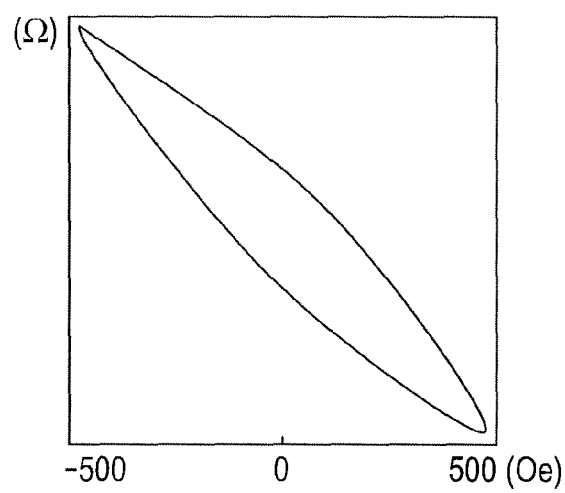
FIG. 4C is an explanatory view showing a measurement example of the magnetic head slider inspection device (in abnormal state)
Figure 4D:
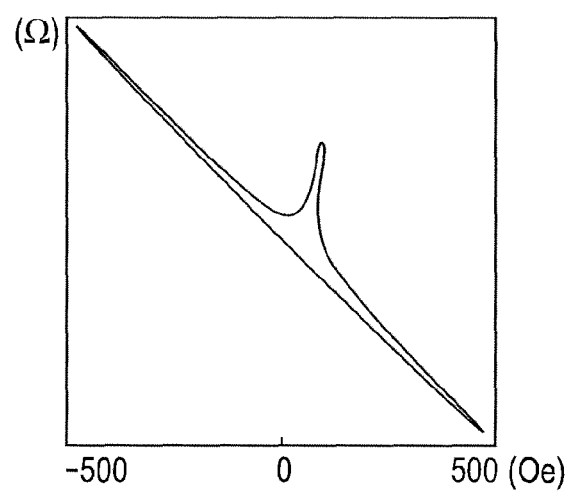
FIG. 4D is an explanatory view showing a measurement example of the magnetic head slider inspection device (in abnormal state)

FIG. 4A represents the change in the resistance value (Ω) of the normal reproducing head 13. Referring to FIG. 4A, if the reproducing head 13 is normal, the resistance value forms a nearly linear-shaped curve corresponding to the magnitude of the magnetic field. If the reproducing head 13 is abnormal, the resultant resistance values form distorted curve, rather than the linear shape, corresponding to the magnitude of the magnetic field as shown in FIGS. 4B to 4D. The control circuit 101 obtains each difference between the curve shown in FIG. 4A and the respective curves shown in FIGS. 4B to 4D to determine whether the reproducing head 13 has been damaged, and to realize measurement of the damage amount of the reproducing head.

Figure 5A:
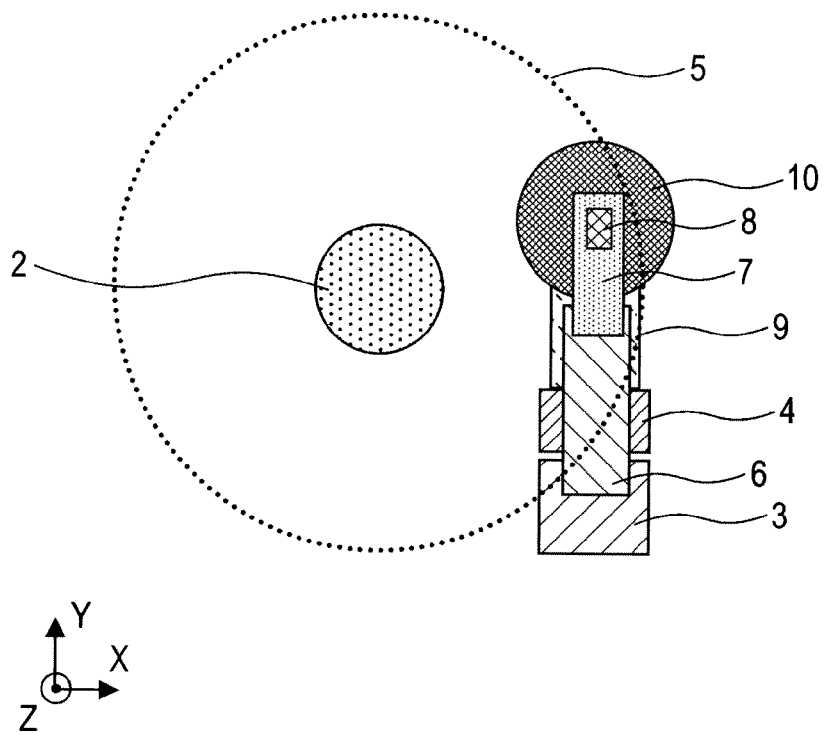
FIG. 5A is an X-Y plan view of a magnetic head slider inspection device according to an embodiment of the present invention (the magnetic head slider moves toward an outer circumference)
Figure 5B:
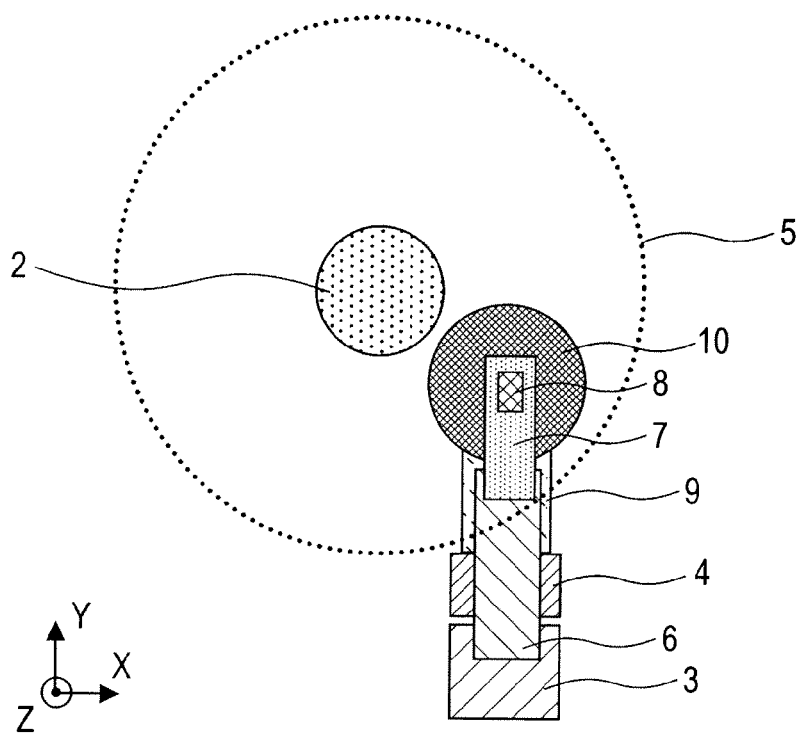
FIG. 5B is an X-Y plan view of a magnetic head slider inspection device according to an embodiment of the present invention (the magnetic head slider moves toward an inner circumference)

FIGS. 5A and 5B are explanatory views representing operations of the stages of X-axis and Y-axis of the head assembly support mechanism 3 and the electromagnet support mechanism 4.

The magnetic head slider 8 combined with the magnetic disk device is activated by the moving mechanism in the magnetic disk device to move from the outer circumference to the inner circumference of the magnetic disk medium in the magnetic disk device. The magnetic head slider 8 has the levitation condition which is different at each radial position of the magnetic disk medium. The levitation condition refers to the relative speed between the magnetic head slider 8 and the magnetic disk medium, and the angle formed by the magnetic head slider 8 and the magnetic disk medium in a circumferential direction.

The magnetic head slider inspection device 1 according to the embodiment is configured to reproduce the levitation condition as described above by moving positions of the respective stages of X-axis and Y-axis of the head assembly support mechanism 3 and the electromagnetic support mechanism 4.

FIG. 5A shows an example that the magnetic head slider 8 has moved to the outer circumference. FIG. 5B shows an example that the magnetic head slider 8 has moved to the inner circumference. As FIGS. 5A and 5B show, the aforementioned control circuit 101 moves each position of X-axis and Y-axis stages of the respective mechanisms to allow the magnetic head slider 8 to measure performance of the reproducing head 13 at various possible positions.

Figure 6A:
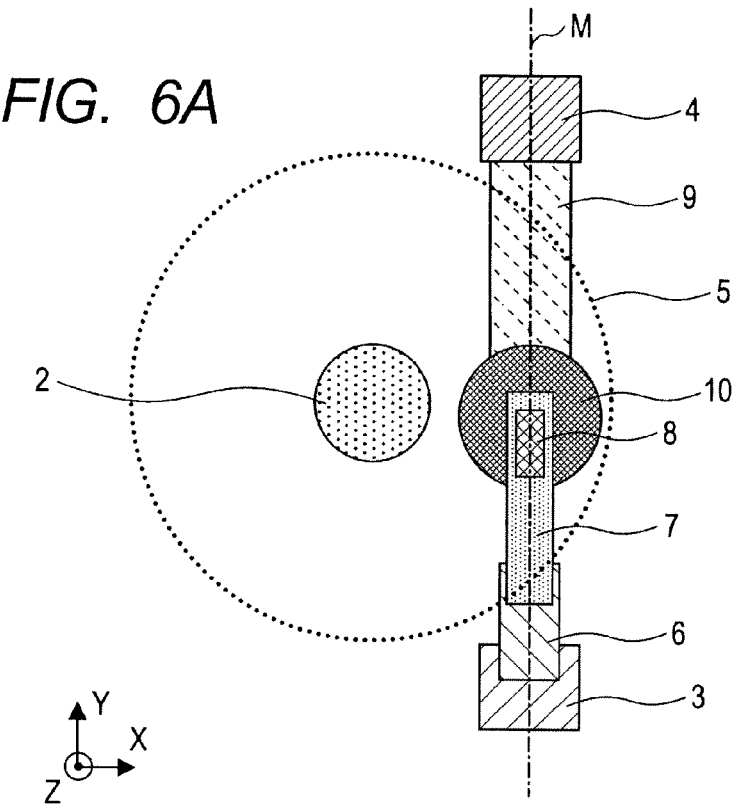
FIG. 6A is an X-Y plan view of a magnetic head slider inspection device according to an embodiment of the present invention (the electromagnet support mechanism is provided along a longitudinal direction of a head assembly support mechanism)
Figure 6B:
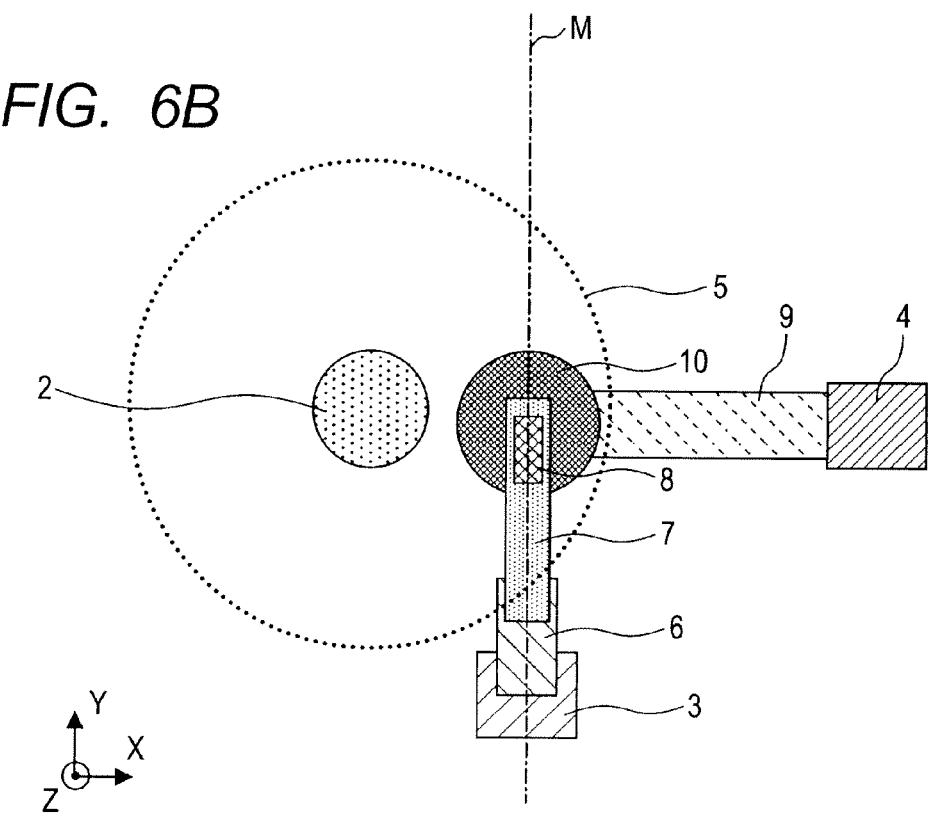
FIG. 6B is an X-Y plan view of a magnetic head slider inspection device according to an embodiment of the present invention (the electromagnet support mechanism is provided at an angle with respect to the head assembly support mechanism)

FIGS. 6A and 6B represent another embodiment representing arrangement of the head assembly support mechanism 3 and the electromagnetic support mechanism 4. The electromagnet support mechanism 4 is not limited to the position other than the one shown in FIG. 1A, and may be at the position as shown in FIG. 6A or 6B. In the embodiment shown in FIGS. 6A and 6B, the space that has been occupied by the electromagnet support mechanism 4 as shown in FIG. 1A is available, and accordingly, the design freedom degree may be improved. For example, as illustrated in FIG. 6A, the electromagnet support mechanism 4 may be provided at the position opposite the head assembly support mechanism 3 in the longitudinal direction (direction of M) of the head assembly support mechanism 3. Alternatively, as shown in FIG. 6B, the electromagnet support mechanism 4 may be provided at right angle with respect to the longitudinal direction (direction of M). In the aforementioned case, it is possible to effectively use the space below the head assembly support mechanism 3, thus improving the design freedom degree.

As described above, the spindle 2 revolves the disk medium 5, and the magnetic head slider 8 is provided with the reproducing head 13 so that the magnetic head slider 8 is kept levitated above the surface of the disk medium 5 under the force generated thereby. The electromagnet 10 is provided at the side opposite the disk medium 5 with respect to the magnetic head slider 8 for generating the magnetic field directed at substantially perpendicular to the surface of the disk medium 5. The circuit unit (electric circuit 100 and control circuit 101) derives the magnetic field from the electromagnet 10 to allow measurement of the resistance value of the reproducing head 13 levitated from the surface of the disk medium 5.

The magnetic field with arbitrary magnitude is externally applied from the magnetic head slider to measure performance of the reproducing head while applying electric current to the respective elements of the levitated magnetic head slider 8. This makes it possible to real-time measure the change in the resistance value of the reproducing head of the levitated magnetic head slider with respect to the external magnetic field, which cannot be measured in the non-levitated state, and the amount of change in the resistance value of the reproducing head to the external magnetic field resulting from damage of the reproducing head upon contact of the magnetic head slider with the disk medium.

Figure 7A:
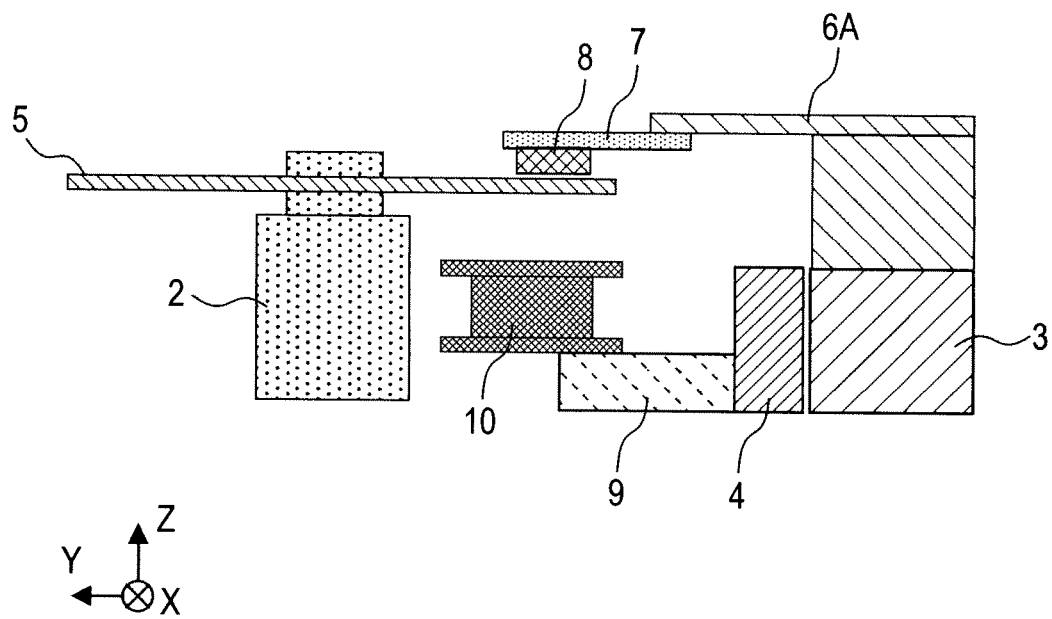
FIG. 7A is a Y-Z plan view of a magnetic head slider inspection device according to an embodiment of the present invention (the magnetic head slider is provided above the disk medium)

FIG. 7A represents another embodiment of arrangement of the head assembly 7 and the electromagnet 10. Besides the arrangement shown in FIG. 1A, the head assembly 7 may be positioned above the disk medium 5 using the head assembly grip mechanism 6A as shown in FIG. 7A.

Figure 7B:
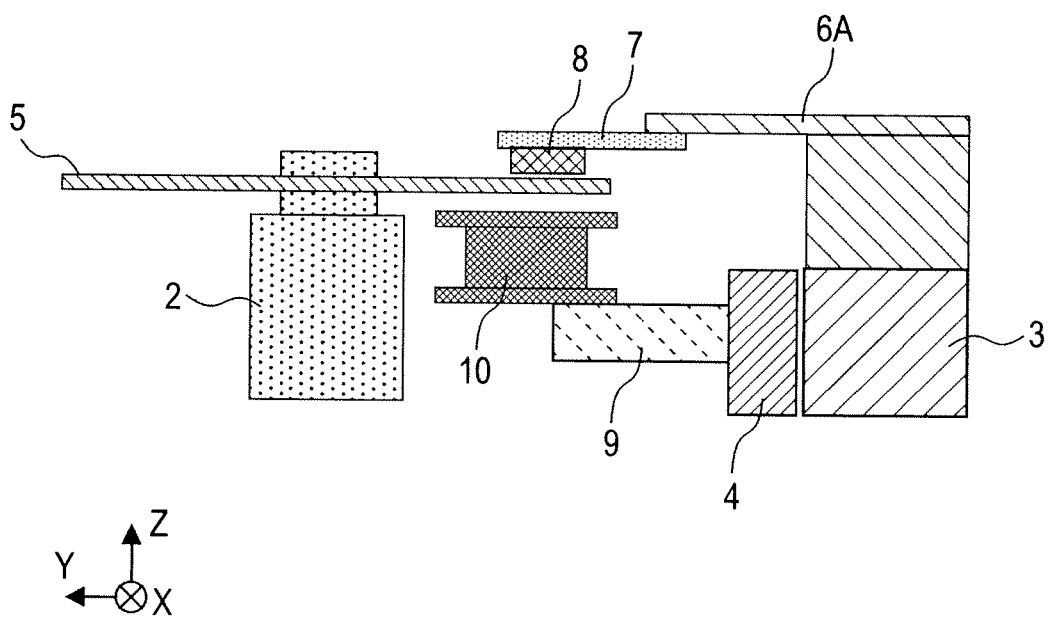
FIG. 7B is a Y-Z plan view of the magnetic head slider inspection device according to an embodiment of the present invention (the magnetic head slider is provided above the disk medium)

In this case, the distance between the magnetic head slider 8 and the electromagnet 10 is increased. For this, the electric current applied to the wire for the electromagnet 10 may be increased, or the Z-axis stage of the electromagnet support mechanism 4 may be moved to allow the electromagnet 10 to be close to the magnetic head slider 8 as shown in FIG. 7B.

Generally, the magnetic disk device includes the magnetic head sliders 8 on both surfaces (upper surface and lower surface) of the magnetic disk medium therein. The structure shown in FIG. 1A is preferable for the performance measurement of the reproducing head 13 of the magnetic head slider 8 below the magnetic disk medium. Each structure shown in FIGS. 7A and 7B is preferable for performance measurement of the reproducing head 13 of the magnetic head slider 8 above the magnetic disk medium.

Figure 7C:
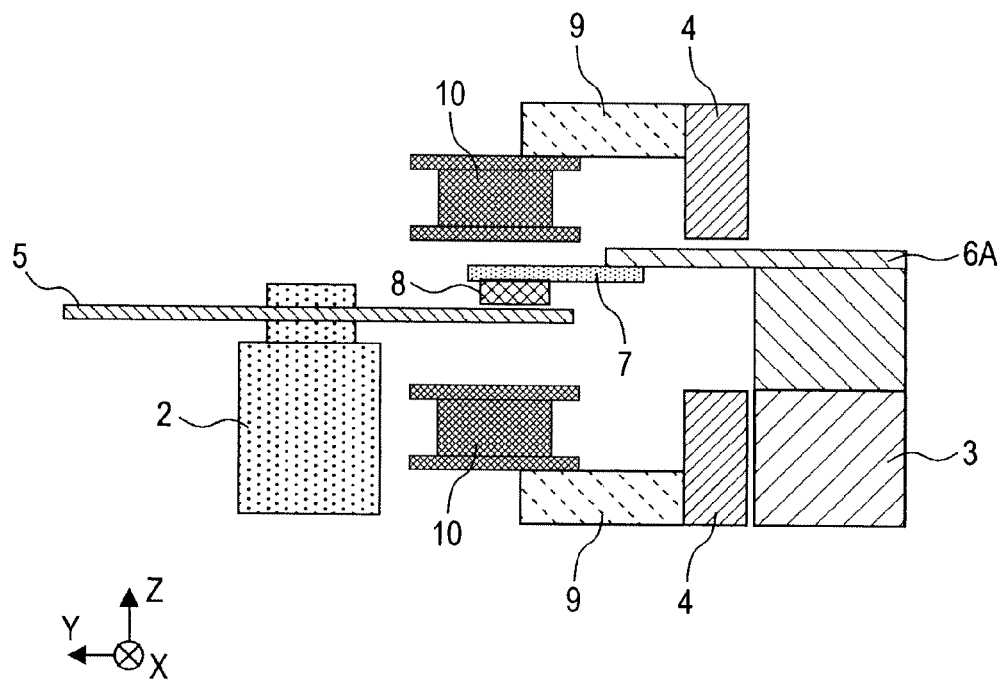
FIG. 7C is a Y-Z plan view of the magnetic head slider inspection device according to an embodiment of the present invention (the electromagnets are provided above and below the disk medium)
Figure 7D:
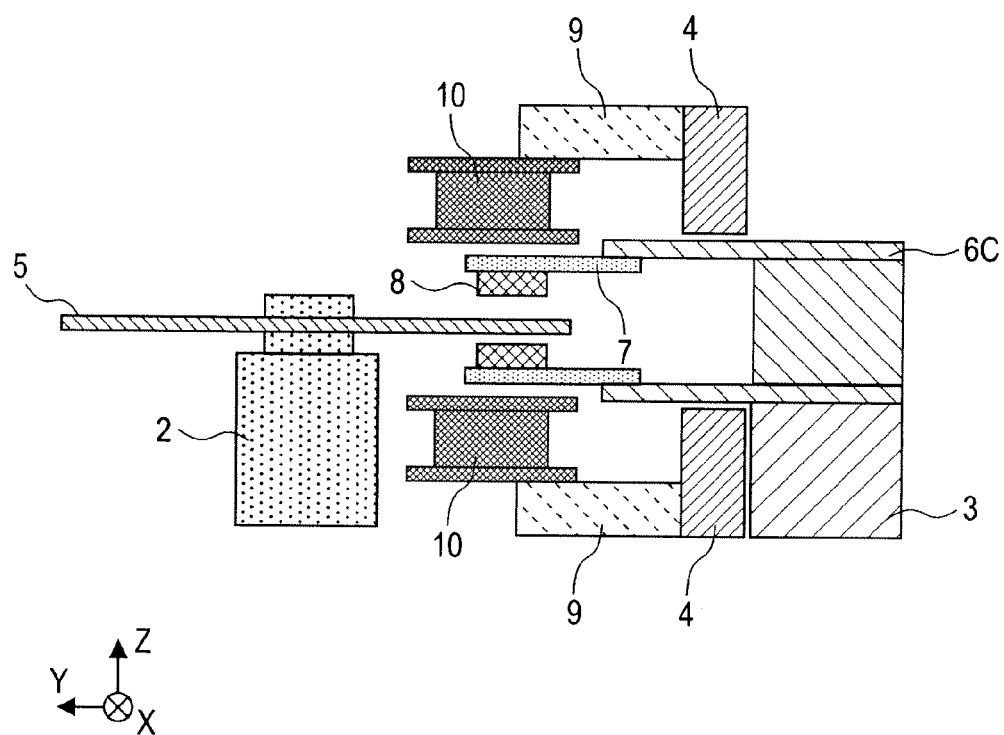
FIG. 7D is a Y-Z plan view of the magnetic head slider inspection device according to an embodiment of the present invention (the electromagnets and the magnetic head sliders are provided above and below the disk medium)

In another embodiment of the present invention, the electromagnet may be provided above the disk medium 5 as shown in FIG. 1B. Alternatively, the electromagnets may be provided above and below the disk medium 5 as shown in FIGS. 7C and 7D. In this case, the electromagnets are provided above and below the disk medium, and corresponding magnetic head sliders 8 on both surfaces (upper and lower surfaces) may be used to measure the respective performances, simultaneously. This allows the reproducting head 13 to be controlled to generate further perpendicular magnetic line 12, resulting in performance measurement of the reproducing head 13 of the magnetic head slider 8 with higher accuracy.

Figure 7E:
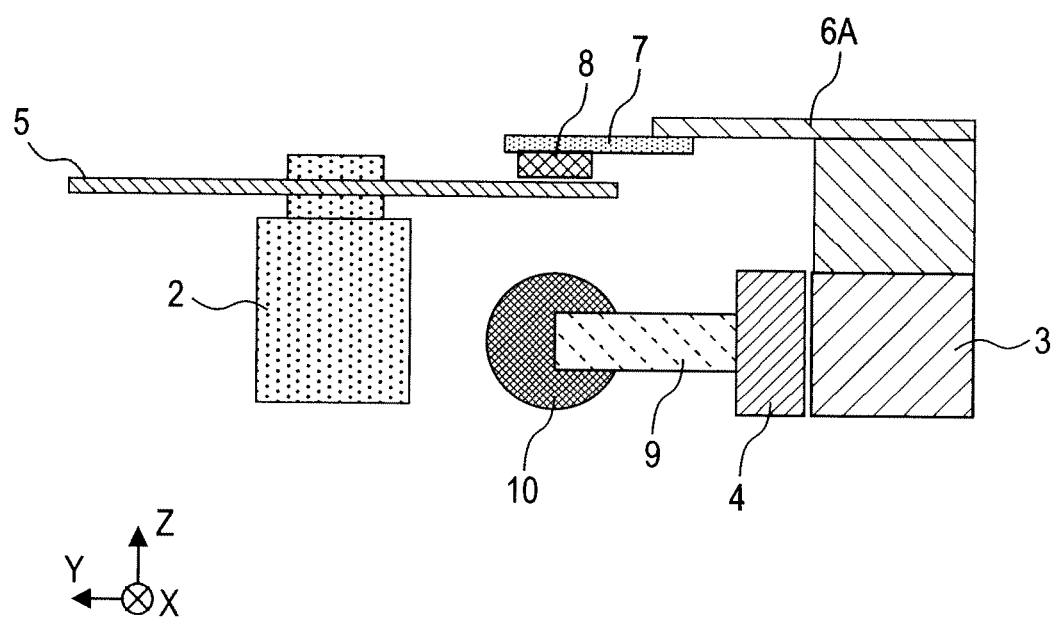
FIG. 7E is a Y-Z plan view of the magnetic head slider inspection device according to an embodiment of the present invention (the electromagnet is provided so that magnetic lines are laterally applied to the disk medium surface)

When conducting the performance measurement of the head slider 8 above the upper surface of the disk medium 5, the revolving direction of the disk medium 5 has to be controlled reversely in the structure having the magnetic head slider 8 provided only below the disk medium 5 as shown in FIG. 7C. However, in the structure having the magnetic head sliders 8 both above and below the disk medium 5 as shown in FIG. 7D, the disk medium 5 does not have to be controlled as described above. Furthermore, electromagnets may be provided to laterally generate magnetic line 12 (in parallel) with respect to the surface of the disk medium 5 (that is, the magnetic head slider 8) to conduct the performance measurement of the reproducing head 13 as shown in FIG. 7E.

Figure 8A:
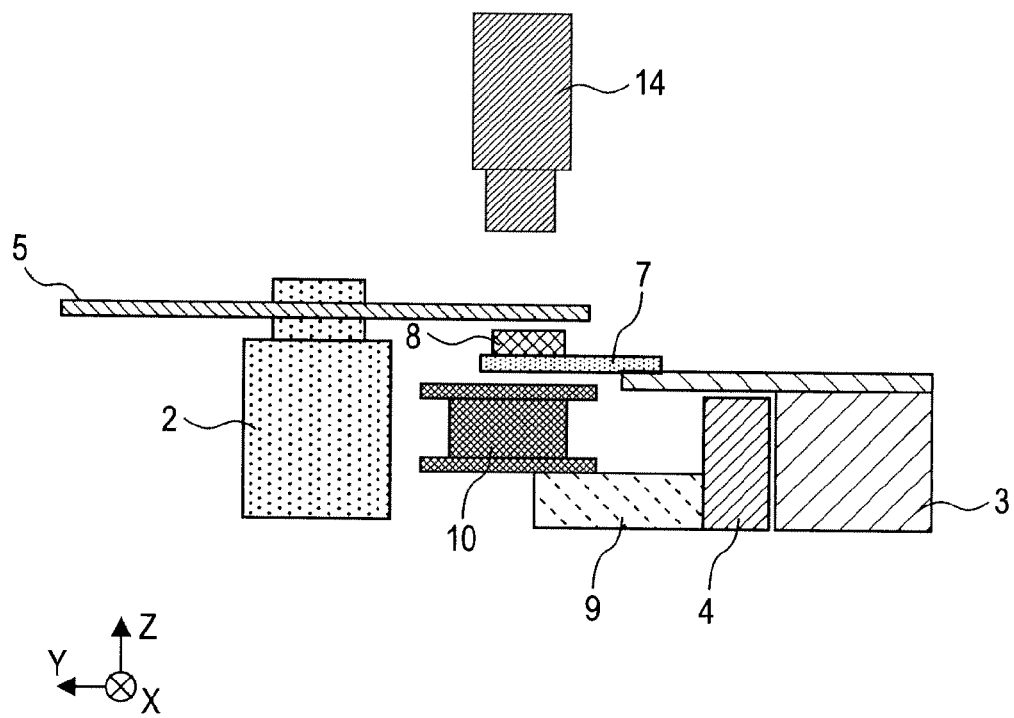
FIG. 8A is a Y-Z plan view of a magnetic head slider inspection device according to an embodiment of the present invention (camera unit is provided)

FIG. 8A shows an example having a camera unit 14. As described above, the magnetic head slider inspection device 1 according to the embodiment may be structured to use a transparent disk medium 5 formed of glass or sapphire without being coated with the magnetic body. This makes it possible to conduct the performance measurement of the reproducing head 13 while observing the levitated magnetic head slider 8 using the camera unit 14.

Besides the optical camera, a camera sensitive for the wavelength other than visible wavelengths, for example, infrared light may be employed as the camera unit 14. When an infrared camera unit is employed, frictional heat generated upon contact between the magnetic head slider 8 and the disk medium 5 may be measured. This makes it possible to conduct the real-time performance measurement of the reproducing head 13 upon generation of frictional heat.

It is preferable to provide a laser Doppler vibrometer (not shown) at the location of the camera unit 14. Measurement of vibration state of the magnetic head slider 8 using the laser Doppler vibrometer allows synchronization of the vibration measurement of the magnetic head slider 8 with the performance measurement of the reproducing head 13.

Figure 8B:
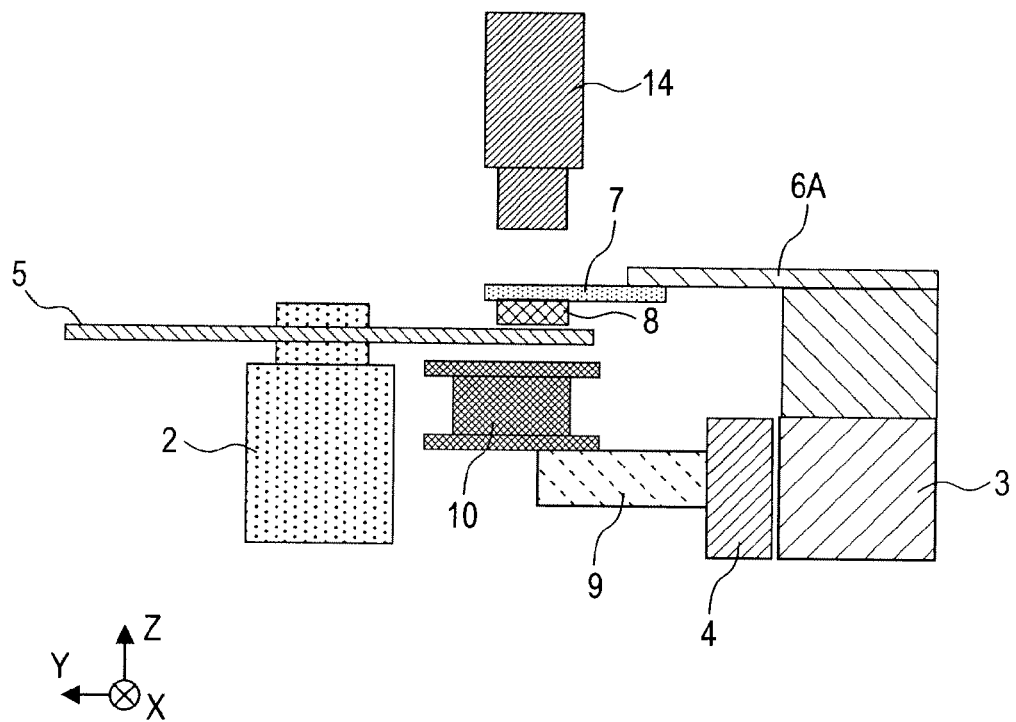
FIG. 8B is a Y-Z plan view of the magnetic head slider inspection device according to an embodiment of the present invention (camera unit is provided).

The camera unit 14 and the laser Doppler vibrometer may be provided outside the sealed casing so as to observe the magnetic head slider 8 via a window (not shown) of the sealed casing. The aforementioned structure is preferable for using the camera unit 14 and the laser Doppler vibrometer which are not suitable for the use in reduced-pressure environment. FIG. 8B shows an example of the structure formed by adding the camera unit 14 to the magnetic head slider inspection device 1 having the magnetic head slider 8 above the upper surface of the disk medium 5.

The respective mechanisms of the magnetic head slider inspection device 1 according to the present invention are controlled by software (not shown) installed in the information processing device such as PC, or the control circuit 101 having the software installed.

It is to be noted that the present invention is not limited to the aforementioned embodiments, and may be realized by modifying the elements in practical stage without departing from the scope of the invention. A plurality of elements described in the embodiments may be combined in arbitrary ways to have various forms. For example, a certain number of elements may be eliminated from all those described in the embodiments. Alternatively, the elements described in the different embodiments may be arbitrarily combined.

What is claimed is:

1. A magnetic head slider inspection device comprising:
a motor unit for revolving a disk medium;
a slider unit provided with a reproducing head, which is levitated from a surface of the disk medium under force generated by the revolving disk medium;
a magnetic field generator positioned at an opposite side of the disk medium with respect to the slider unit for generating a magnetic field substantially perpendicular to the disk medium surface; and
a circuit unit for generating the magnetic field from the magnetic field generator, and measuring a resistance value of the reproducing head levitated from the disk medium surface,
wherein the magnetic field generator is an electromagnet having a conductive wire wound around into a coil, to which electric current is applied for temporarily generating the magnetic field; and
the circuit unit includes an electric circuit for applying the electric current to the electromagnet to generate the magnetic field from the electromagnet so that the resistance value of the reproducing head levitated from the disk medium surface is measured.

2. The magnetic head slider inspection device according to claim 1, further comprising:
a slider stage mechanism provided with a stage for fixing or moving the slider unit; and
an electromagnet stage mechanism provided with a stage for fixing or moving the electromagnet,
wherein the circuit unit controls operations of the slider stage mechanism and the electromagnet stage mechanism.

3. The magnetic head slider inspection device according to claim 1, wherein the slider unit includes a heater element for expanding the slider unit by thermally expanding the resistor element.

4. The magnetic head slider inspection device according to claim 1, provided in a sealed casing, further comprising a pressure reducing mechanism for reducing pressure by pumping air out of the casing.

5. The magnetic head slider inspection device according to claim 2, wherein the slider stage mechanism and the electromagnet stage mechanism are provided in the same radial direction from a center of the disk medium.

6. The magnetic head slider inspection device according to claim 2, wherein the slider stage mechanism and the electromagnet stage mechanism are provided in different radial directions from a center of the disk medium.

7. The magnetic head slider inspection device according to claim 6, wherein the slider stage mechanism and the electromagnet stage mechanism are provided in different radial directions from the center of the disk medium at opposite positions.

8. The magnetic head slider inspection device according to claim 1, wherein one of the magnetic field generators is provided opposite the disk medium with respect to the slider unit, and the other is provided opposite the slider unit with respect to the disk medium.

9. The magnetic head slider inspection device according to claim 1, wherein the electromagnet is directed to generate the magnetic field substantially in parallel to the disk medium surface.

10. The magnetic head slider inspection device according to claim 1, further comprising an image pickup device above the disk medium for picking up an image of the disk medium.

11. The magnetic head slider inspection device according to claim 1, further comprising a laser Doppler vibrometer above the disk medium.

12. The magnetic head slider inspection device according to claim 10,
wherein the image pickup device or a laser Doppler vibrometer is provided outside the casing; and
the casing includes a window through which the slider unit is visually observed.

13. The magnetic head slider inspection device according to claim 1, wherein the circuit unit allows the magnetic field generator to generate the magnetic field in response to an instruction from an external information processing device, and measures the resistance value of the reproducing head levitated from the disk medium surface.

* * * * *